United States Patent [19]

Müller et al.

[11] Patent Number: 5,206,287
[45] Date of Patent: Apr. 27, 1993

[54] REACTIVE SYSTEMS AND A PROCESS FOR THE PREPARATION OF MODIFIED DUROPLASTS

[75] Inventors: Hanns-Peter Müller, Bergisch Gladbach; Joachim Franke; Christian Lindner, both of Cologne; Horst Gruttmann; Hans-Dieter Jacob, both of Leverkusen, all of Fed. Rep. of Germany

[73] Assignee: Bayer Aktiengesellschaft, Leverkusen, Fed. Rep. of Germany

[21] Appl. No.: 758,041

[22] Filed: Sep. 12, 1991

[30] Foreign Application Priority Data

Sep. 21, 1990 [DE] Fed. Rep. of Germany ....... 4029887

[51] Int. Cl.$^5$ ............................................... C08G 18/04

[52] U.S. Cl. ........................................ 525/65; 528/48; 528/51; 528/73; 427/386; 428/422.8; 428/423.1; 428/423.5

[58] Field of Search ...................... 525/65; 528/48, 51, 528/73; 427/386; 428/422.8, 423.1, 423.5, 423.6

[56] References Cited

U.S. PATENT DOCUMENTS

| | | | |
|---|---|---|---|
| 3,496,250 | 2/1970 | Czerwinski | 260/836 |
| 4,788,224 | 11/1988 | Müller et al. | 521/104 |
| 5,021,536 | 6/1991 | Müller et al. | 528/73 |

Primary Examiner—Maurice J. Welsh
Attorney, Agent, or Firm—Joseph C. Gil; Godfried R. Akorli

[57] ABSTRACT

Reactive systems consisting of organic polyisocyanates, organic polyepoxides, polymer modifiers, special catalysts and optionally other auxiliary agents and additives.

12 Claims, No Drawings

REACTIVE SYSTEMS AND A PROCESS FOR THE PREPARATION OF MODIFIED DUROPLASTS

BACKGROUND OF THE INVENTION

The present invention relates to new reactive systems comprising organic polyisocyanates, organic polyepoxides, polymer modifiers, special catalysts and optionally other auxiliary agents and additives.

Reactive systems based on epoxide/isocyanate (EPIC) components are described, for example, in DE 36 44 382.

EPIC resins have good processing and curing properties and when cured give rise to articles having good mechanical strength, chemical resistance and high glass transition temperatures. However, the products are relatively brittle. The same applies to epoxide resins and duroplasts, in general.

It has long been the wish of users of such products to have available duroplastic synthetic resins which combine high rigidity with chemical resistance, heat resistance, improved toughness and ductility.

It was, therefore, an objective of this invention to develop EPIC resins which when cured give rise to articles with improved toughness without loss of rigidity and heat resistance. The present invention provided EPIC resins which meet this objective by employing polymer modifiers. It is known that modifiers are used as polymer blending partners for thermoplastic synthetic resin blends (e.g. on the basis of polyvinyl chloride (PVC). It was, however, surprising that polymer modifiers of the type of graft rubbers achieve the objective of this invention.

SUMMARY OF THE INVENTION

It was surprising that the use of certain graft rubbers improves the relevant mechanical properties of cured (i.e.) crosslinked) EPIC resins without impairing the thermal properties The present invention thus relates to reactive systems comprising:
a) a storage stable mixture of (i) a polyisocyanate component containing at least one organic polyisocyanate and (ii) an epoxide component containing at least one organic oxide, in which the storage stability has been secured by a heat treatment of the epoxide component (ii) carried out in the presence of an alkylating agent and optionally in the presence of at least part of polyisocyanate component (i) the ratios of components (i) and (ii) being chosen so that 100 g of component a) contains from 0.005 to 0.4 mol of epoxide groups,
b) a polymer modifier which is a graft rubber,
c) a catalyst, and
d) optionally auxiliary agents and additives, characterized in that at most 100 grams (g) of the polymer modifier of component b) are used for every 100 g of resin of component a).

The invention also relates to reactive systems comprising
a) a storage stable mixture of (i) a polyisocyanate component containing at least one organic polyisocyanate and (ii) an epoxide component containing at least one organic epoxide which is reacted in the presence of a tertiary amine as catalyst to give rise to an intermediate product containing oxazolidinone and isocyanurate groups, which product has a relatively high viscosity or is solid at room temperature, the reaction being stopped by the addition of a quantity of alkylating sulphonic acid alkyl ester at least equivalent to the quantity of amine when at most 65% of the isocyanate groups present in the starting mixture have undergone reaction, the quantitative ratios of components (i) and (ii) being chosen so that 100 g of component a) contain from 0.005 to 0.4 mol of epoxide groups,
b) a polymer modifier which is a graft rubber,
c) a catalyst and
d) optionally an auxiliary agent and an additive, characterized in that at most 100 g of component b) are put into the process for every 100 g of component a).

A preferred embodiment of the invention comprises reactive systems in which polyisocyanate component (i) present in component a) is a polyisocyanate or polyisocyanate mixture of the diphenylmethane series which is liquid at room temperature or a derivative, which is liquid at room temperature, of such a polyisocyanate or polyisocyanate mixture.

Component b) is a graft polymer of vinyl monomers on a particulate, at least partially cross-linked rubber polymer, the said graft polymer having rubber contents of from 30-80% by weight, based on 100 parts by weight of b).

The compounds used as component c) are tertiary amines, imidazoles and/or latent catalysts of the type of tertiary or quaternary ammonium salts of alkylating esters or acid esters of organic phosphonic acids or phosphoric acids and/or addition complexes of boron trihalides with tertiary amines.

The invention also relates to a process for the preparation of (optionally foamed) synthetic resins containing isocyanurate groups, characterized in that a reactive system comprising:
a) a storage stable mixture of (i) a polyisocyanate component containing at least one organic polyisocyanate and (ii) an epoxide component containing at least one organic epoxide, in which the storage stability has been secured by a heat treatment of the epoxide component (ii) in the presence of an alkylating agent and optionally in the presence of at least a part of polyisocyanate component (i), the quantitative ratios of components (i) and (ii) being chosen so that 100 g of component a) contain from 0.005 to 0.4 mol of epoxide groups,
b) a polymer modifier which is a graft rubber,
c) a catalyst and
d) optionally an auxiliary agent and an additive, such as blowing agents in the case of foamed products, is prepared by mixing the individual components and then converting the resultant resin into the final cross-linked state by the supply of heat and/or utilization of heat of reaction, and optionally shaping the resultant resin.

The invention also relates to a process for the two-stage production of synthetic resins containing isocyanurate and oxazolidinone groups, characterized in that a reactive system comprises:
a) a storage stable mixture of (i) a polyisocyanate component containing at least one organic polyisocyanate and (ii) an epoxide component containing at least one organic epoxide which has been converted by a reaction in the presence of a tertiary amine as catalyst into an intermediate product containing oxazolidinone and isocyanurate groups which has a relatively high viscosity or is solid at room temperature, the reaction being stopped by the addition of a quantity of the alkylating sulphonic acid alkyl ester at least equivalent to the quantity of amine when at most 65% of the isocyanate groups present in the starting mixture have undergone reaction, and the quantitative ratios of components (i) and (ii) being so chosen that 100 g of component a) contain from 0.005 to 0.4 mol of epoxide groups, b) a polymer modifier from which is a graft rubbers and
c) a latent catalyst is optionally mixed with further
d) an auxiliary agent and an additives, optionally after having been dissolved in a suitable solvent, and the solvent is optionally evaporated off and the resultant resin mixture, in a first stage, is homogenized in an extruder at temperatures below 100° C., and converted into the final cross-linked state in a second stage and optionally accompanied by shaping the resultant resin and further action of heat.

Lastly, the invention relates to a process for the preparation of high performance composite materials selected from the group consisting of glass, carbon or aramide fibers in the form of woven or knitted fabrics, non-woven webs, sheets or unidirectional fibers which are impregnated to form prepregs with a resin mixture preactivated by latent catalysts according to the invention. Optionally after the resin have been dissolved in a suitable solvent, the solvent if used is evaporated off in a suitable apparatus and the prepregs obtained are cured in a second stage to form the final molded product, by a process involving shaping and further action of heat and pressure, optionally after storage in the absence of moisture.

In a preferred embodiment, component a) is converted into a relatively high viscosity intermediate product containing oxazolidinone and isocyanurate groups in the presence of a tertiary amine as catalyst and the reaction is stopped by the addition of a quantity of the alkylating sulphonic acid alkyl ester, methyl iodide or dimethyl sulphate at least equivalent to the quantity of amine when at most 65% of the isocyanate groups present in the starting mixture have undergone reaction. The intermediate product thus obtained, which is still liquid, is then reacted in the presence of components b) and c) and optionally d).

In another preferred embodiment, component a) is reacted by the procedure described above until an intermediate product which is solid at room temperature is obtained and the reaction is stopped by the addition of alkylating agent. The resultant melt is then cooled and granulated and the resultant intermediate product which is a solid is mixed with components b) and c) and optionally d) in solution (e.g. methyl ethyl ketone). Alternatively, a coarse preliminary mixture may be prepared from the granulated intermediate product a) and components b) and c) and optionally d) and this mixture may then be homogenized in an extruder at temperatures of preferably <100° C.

The intermediate product thus obtained are stable in storage and may be cured to form the final molded articles in a second stage involving a molding process and further action of heat under pressure, optionally in the presence of glass, carbon, aramide or metal wire, fibers, woven fabrics or non-woven webs.

DETAILED DESCRIPTION OF THE INVENTION

Component a) of the reactive systems according to the invention is a mixture of (i) a polyisocyanate component and (ii) an epoxide component, the latter being stabilized by a heat treatment in the presence of an alkylating agent according to German patent applications 38 07 660 and 36 44 382.

Polyisocyanate component (i) contains at least one organic polyisocyanate of the type known from polyurethane chemistry. Examples of suitable polyisocyanates include hexamethylene diisocyanate, isophorone diisocyanate, trans cyclohexyldiisocyanate, the isomeric xylylene diisocyanates, 4,4'-diisocyanatodicyclohexylmethane, 2,4- and/or 2,6-diisocyanatotoluene and 4,4-diisocyanatodiphenylmethane optionally with small quantities of 2,2'-diisocyanatodiphenylmethane and/or with its higher homologues. Such mixtures are obtained, as is known, in the known process of phosgenation of aniline formaldehyde condensates. Derivatives of these polyisocyanates modified with urethane and/or carbodiimide and/or uretdione and/or isocyanurate and/or biuret groups are also suitable. Polyisocyanate component (i) preferably contains at least one aromatic polyisocyanate. Polyisocyanates or polyisocyanate mixtures of the diphenylmethane series which are liquid at room temperature or derivatives of these polyisocyanates or polyisocyanate mixtures, which are also liquid at room temperature, are particularly suitable. Polyisocyanate component (i) generally has an isocyanate content of from 15 to 50% by weight, preferably from 22 to 34% by weight.

The epoxide component (ii) contains at least one organic epoxide, i.e. preferably at least one organic compound containing 1 to 4, in particular 1 or 2 epoxide groups per molecule and having an epoxide equivalent weight of from 58 to 500, preferably from 170 to 220. Suitable epoxides include monoepoxides such as, for example, phenoxy-propylene oxide, styrene oxide or glycidyl alcohol or higher functional polyepoxides such as, for example, polyglycidyl ethers of polyvalent phenols, in particular of bisphenol A; also, polyepoxide compounds based on aromatic amines, in particular bis-(N-epoxypropyl)-aniline, N,N'-dimethyl-N,N'-diepoxypropyl-4,4'-diaminodiphenylmethane and N-diepoxypropyl-4-aminophenylglycidyl ether; polyglycidyl esters of cycloaliphatic dicarboxylic acids, in particular hexahydrophthalic acid diglycidyl ester and polyepoxides obtained from the reaction product of n mols of hexahydrophthalic acid anhydride and 1 mol of a polyol having n hydroxyl groups (n=integer from 2 to 6), in particular 3 mol. of hexahydrophthalic acid anhydride and 1 mol. of 1,1,1-trimethylolpropane, 3,4-epoxycyclohexyl-methane, 3,4-epoxycyclohexanecarboxylate.

The epoxides (ii) are present in components a) according to the invention in a form in which they are inhibited in their reactivity with isocyanate groups, i.e. in a stabilized form. The stabilization of the epoxides is carried out by a heat treatment at 30° to 150° C., preferably 80° to 130° C., in the presence of an alkylating agent which is, generally, used in a quantity of from 0.005 to 1% by weight, preferably 0.05 to 0.25% by weight, based on the weight of the epoxide. The heat treatment is, generally, carried out for a period of from 15 to 60 minutes and may take place either in the absence of polyisocyanate component (i) or in the presence of at least part of this component. This means that both the addition of the alkylating agent and the subsequent heat treatment may be carried out both before the epoxide is combined with the isocyanate and after the epoxide has been mixed with at least part of the polyisocyanate.

Examples of suitable alkylating agents include methyl iodide, dimethylsulphate and especially sulphonic acid alkyl esters in the molecular weight range of from 110 to 250 having 1 to 4 carbon atoms in the alkyl group. These include both aliphatic sulphonic acid alkyl esters such as n-butane sulphonic acid methyl ester, n-perfluorobutane sulphonic acid methyl ester and n-hexane sulphonic acid ethyl ester and aromatic sulphonic acid alkyl esters such as benzene sulphonic acid methyl ester, ethyl ester or n-butyl ester, p-toluene sulphonic acid methyl ester, ethyl ester or n-butyl ester, 1-naphthalene sulphonic acid methyl ester, 3-nitrobenzene sulphonic acid methyl ester or 2-naphthalene sulphonic acid ethyl ester. The aromatic sulphonic acid esters mentioned as examples are preferred. p-toluene sulphonic acid methyl ester is particularly preferred.

Component a) contains the epoxides (ii) in such a quantity that 100 g of component a) contains from 0.005 to 0.4, preferably from 0.01 to 0.15 mol of epoxide groups.

The component b) of the systems according to the invention is a known graft rubber comprising a graft polymer with softening temperatures below 0.C and a polymer of at least one vinyl monomer polymer which is at least partially grafted on the rubber. The rubbers used may be diene monomer rubbers based on butadiene, isoprene or chloroprene optionally mixed with up to 35% by weight of other monomers, such as styrene, acrylonitrile or alkyl(meth)acrylate, or olefin rubbers based on ethylene, propylene, isobutylene, vinyl acetate, carbon monoxide, alkyl acrylate and small quantities of diene monomers or alkyl acrylate rubbers based on alkyl acrylate monomers (in particular $C_1$–$C_7$-alkyl acrylate) optionally mixed with up to 10% by weight of other vinyl or alkyl monomers. Graft rubbers b) with at least partially cross-linked systems are particularly preferred and are produced by radical grafting of vinyl monomers on a rubber polymer which is at least partially cross-linked.

Particularly preferred graft rubbers have a particulate structure with average particle diameters ($d_{50}$ value) of from 0.1 to 0.8 μm.

The component b) graft rubbers are preferably produced by known radical emulsion graft polymerization. Graft rubbers b) which have a rubber content of from 40 to 80% by weight (based on 100 parts by weight of b)) are particularly preferred for the preparation of the systems according to the invention.

Preferred grafted vinyl monomers comprise at least one monomer selected from styrene, p-methylstyrene, α-methylstyrene, acrylonitrile, methacrylonitrile, (1-6-alkyl(meth))-acrylate, vinyl acetate, vinyl ether, maleic acid anhydride, maleic acid imides or (meth)acrylamides; styrene/acrylonitrile combinations and combinations containing methyl methacrylate are particularly suitable graft monomers. The polymers known to one skilled in the art as ABS, ASA, EPAS or MFS are particularly preferred graft polymers.

Catalyst component c) may be any monofunctional or polyfunctional organic amines containing tertiary amino groups. Suitable amines of this type generally have a molecular weight of up to 353, preferably from 101 to 185. Tertiary amines such as triethylamine, tributylamine, N,N,N',N'-tetramethyl ethylene diamine, N,N-dimethylbenzylamine, N,N-dibenzylmethylamine, triethylenediamine, dimethyloctylamine, N-methylmorpholine and bis-(N,N-dimethyl-aminoethyl)ether are preferred.

The catalyst component c) is used in a quantity of from 0.01 to 3% by weight, preferably from 0.01 to 1% by weight, based on the total weight of components a) and b).

The procedure has been described in detail in the two-stage process in German Patent Application 36 44 382 which is also applicable to the present invention.

The following compounds are preferred when imidazoles are used as catalysts: N-methylimidazole, cyanoethyl-phenyl imidazole and ethyl methyl imidazole.

The latent catalysts c) used are preferably of the type which have been described in detail and published in DE 36 44 382 on page 13, lines 7 to page 16, line 21. The auxiliary agents and additives d) optionally used have also been described in detail and published in DE 36 44 382, page 17, line 9 to page 19, line 33. The same applies to the use of these auxiliary agents and additives, page 19, line 35 to page 21, line 15. The auxiliary agents and additives are understood to be blowing agents, e.g. (halogenated) hydrocarbons, water or special catalysts which split off $CO_2$ to form carbodiimides.

Curing of the reactive systems according to the invention is generally carried out by heating the mixtures to temperatures of at least 60° C., preferably from 60° to 150° C. For obtaining optimum properties, it is in many cases advisable to carry out an after-curing of the resulting synthetic resins at temperatures from 150° to 250° C., preferably from 200° to 230° C.

When the two-stage process is employed, the resins may be briefly homogenized by melting them in an extruder at temperatures below 100.C with the latent catalyst and the polymeric modifiers b) according to the invention and optionally other auxiliary agents and additives of the type described above and then converted into the final cross-linked resins by the application of further heat, optionally after an intermediate period of storage.

The process according to the invention may be used for the preparation of highly heat-resistant, impact strength modified duroplastic synthetic resins. It may, therefore, be employed for the production of molded parts and construction materials for motor car, air crafts, electrically driven apparatus and many other materials for which a combination of high chemical resistance, heat resistance, toughness and rigidity of the synthetic resins is desired.

The process according to the invention may also be employed for the production of impregnated masses for electric insulations or for glass fiber reinforced laminates. The process according to the invention is suitable for the production of electrical parts by the casting process. These include, for example, printed circuits, electronic clocks, pocket calculators, electronic cameras, computers, microcomputers and digital data stores. Such articles are always produced by a process entailing a suitable molding operation which may be carried out before or during the heat treatment. The resins may also be used as compression molding compounds for the electronic industry.

The heat resistance of the products according to the invention, the low dielectric losses, the moisture resistance and the abrasion resistance as well as the processibility in molds are excellent. Further, the process according to the invention is suitable for the production of insulating materials of insulating classes H and C in electric motors and generators and for the production of constructional materials for aircraft, rockets or other highly stressed apparatus. When the resins are solid products, they may be used as powder lacquer binders or as adhesives, in particular for thermoplasts. The products may also be used for the production of insulators, transformers, capacitors and laminates for the manufacture of pipes, containers or sports appliances if the resins are processed accordingly.

The invention will now be described in more detail with the aid of the Examples which follow.

EXAMPLES

The following ABS graft polymer was used as polymer modifier (Component b): The polymer was present in the form of 5a coarse powder consisting of 55% by weight of butadiene containing 88% by weight and 45% by weight of styrene-acrylonitrile copolymer (with an acrylonitrile content of 28% by weight). The polymer has an average particle size of 0.4 μm ($d_{50}$-value).

EXAMPLE 1

64 Parts by weight of a mixture of 60% of 2,4-diisocyanatodiphenylmethane and 40% of 4,4-diisocyanato-diphenylmethane (isocyanate content 33.6%) are heated to 120° C. for 30 minutes together with 16 parts by weight of the diglycidyl ether of bisphenol A (epoxide number 0.5), 0.08 parts by weight of p-toluenesulphonic acid methyl ester and 20 parts by weight of polymer modifier (as described above) with stirring under nitrogen. A storage stable, white dispersed resin having the following characteristics is obtained after cooling: NCO content=20.2% Viscosity at 25° C.=11890 mPa.s.

To prepare a duroplast, 1 g of dimethyl benzyl ammonium dibutyl phosphate is mixed with 100 g of the above resin and the mixture is degasified under vacuum with stirring and poured into a mold. The mold is heated in an oven for 4 hours at 80° C., 16 hours at 120° C., 4 hours at 180° C. and 4 hours at 200° C.

Mechanical properties of the sample plate: see Table 1.

EXAMPLE 2 (COMPARISON EXAMPLE):

64 Parts by weight of the isocyanate mixture from Example 1 and 16 parts by weight of the epoxide resin from Example 1 are heated to 120° C. together with 0.08 parts by weight of p-toluenesulphonic acid methyl ester for 30 minutes with stirring under nitrogen. The storage stable resin has an isocyanate content of 26.2% and a viscosity of 30 mPa.s at 25° C.

To prepare a duroplast, 100 g of this resin are mixed with 1 g of dimethylbenzylammonium dibutylphosphate and the mixture is degasified under vacuum with stirring and poured into a mold. The mold is heated in an oven for 4 hours at 80° C., 16 hours at 120° C., 4 hours at 180° C. and 4 hours at 200° C.

Mechanical properties of the sample plate: see Table 1.

EXAMPLE 3

70 Parts by weight of the isocyanate mixture from Example 1 and 10 parts by weight of the epoxide resin from Example 1 are heated to 90° C. for 30 minutes together with 0.8 parts by weight of p-toluenesulphonic acid methyl ester and 20 parts by weight of the polymer modifier from Example 1 with stirring under nitrogen.

A storage stable, dispersed resin having the following characteristics is obtained after cooling:
NCO content: 23.1%
Viscosity: 6000 mPa.s at 25° C.

1 Part by weight of dimethylbenzylammonium dibutylphosphate is added to 100 parts by weight of this resin and the mixture is degasified in a vacuum with stirring and poured into a mold. The mold is heated in an oven for 2 hours at 100° C., 2 hours at 120° C., 4 hours at 160° C. and 16 hours at 200° C.

Mechanical properties of the sample plates: see Table 1.

EXAMPLE 4

160 Parts by weight of the isocyanate mixture from Example 1 and 400 parts by weight of the epoxide resin from Example 1 are mixed with 0.3 parts by weight of dimethylbenzylamine with stirring under nitrogen and heated to 130° C. The isocyanate content falls to 13.8% within 7 hours. The reaction is stopped by the addition of I part by weight of p-toluenesulphonic acid methyl ester followed by 30 minutes stirring at 130° C. The viscous melt is poured out and solidifies at room temperature to a non-tacky resin (B-state). The isocyanate content is then 13.2%.

900 Parts by weight of this resin in the B-state are mixed with 100 parts by weight of the polymer modifier from Example 1 and 10 parts by weight of a dimethyloctyl amine $BCl_3$ complex in an extruder at 80° C. for 2 minutes. The isocyanate content of the product, which is tack-free at room temperature, is 10.3%. 14 Days after storage at room temperature, the NCO content is 10.2%. A sample melts, flows easily at 160° C. and cross-links after 3 minutes.

TABLE 1

| Mechanical properties of the modified duroplasts (from Examples 1 and 3) by comparison with Example 2 | | | | |
|---|---|---|---|---|
| | Method of measuring DIN | Duroplast from Example | | |
| | | 1 | 2 (Comp.) | 3 |
| Tensile strength [MPa · s] | 53455 | 53.98 | 49.46 | 62.36 |
| Elongation at break [%] | 53455 | 2.8 | 1.45 | 3.54 |
| E-Modulus from tension test [MPa · s] | 53457 | 3267 | 3641 | 2303 |
| Flexural strength [MPa · s] | 53452 | 107.1 | 100.8 | 122.9 |
| Edge fiber elongation (%) | 53452 | 5.21 | 4.05 | 7.41 |
| Martens degree [°C.] | 53458 | 197 | 192 | 202 |

What is claimed is:
1. A reactive system comprising:
a) a storage stable mixture of (i) a polyisocyanate component containing at least one organic polyisocyanate and (ii) an epoxide component containing at least one organic epoxide, in which the stability in storage has been ensured by a heat treatment of the epoxide component (ii) in the presence of an alkylating agent, optionally carried out in the presence of at least part of polyisocyanate component (i), the quantitative ratios of components (i) and (ii) being chosen so that 100 g of component a) contain from 0.005 to 0.4 mol of epoxide groups,
b) a polymer modifier which is a graft rubber,
c) a catalyst and
d) optionally auxiliary agents and additives, at most 100 g of polymer modifier of component b) being used for 100 g of the resin of component a).

2. A reactive system comprising:
a) a storage stable mixture of (i) a polyisocyanate component containing at least one organic polyisocyanate and (ii) an epoxide component containing at least one organic epoxide which has been reacted in the presence of a tertiary amine as a catalyst to form an intermediate product which has a relatively high viscosity or is solid at room temperature and contains oxazolidinone and isocyanurate groups, the reaction being stopped by the addition of a quantity of alkylating sulphonic acid alkyl ester at least equivalent to the quantity of amine when at most 65% of the isocyanate groups present in the starting mixture have undergone reaction, and the quantitative ratios of components (i) and (ii) being chosen so that 100 g of component a) contain from 0.005 to 0.4 mol of epoxide groups,
b) a polymer modifier which is a graft rubber,
c) a catalyst and
d) optionally auxiliary agents and additives, at most 100 g of component b) being used for 100 g of component a).

3. A reactive system according to claim 1 characterized in that the polyisocyanate component (i) present in component a) is a polyisocyanate or polyisocyanate mixture of the diphenylmethane series which is liquid at room temperature or a derivative thereof which is liquid at room temperature.

4. A reactive system according to claim 2 characterized in that the polyisocyanate component (i) present in component a) is a polyisocyanate or polyisocyanate mixture of the diphenylmethane series which is liquid at room temperature or a derivative thereof, which is liquid at room temperature.

5. A reactive system according to claim 1 characterized in that component b) is a graft polymer of vinyl monomers on a particulate, at least partially crosslinked rubber polymer, the graft polymer having a rubber content of from 30 to 80% by weight, based on 100 parts by weight of b).

6. A reactive system according to claim 2 characterized in that component b) is a graft polymer of vinyl monomers on a particulate, at least partially crosslinked rubber polymer, the graft polymer having a rubber content of from 30 to 80% by weight, based on 100 parts by weight of b).

7. A reactive system according to claim 3 characterized in that component b) is a graft polymer of vinyl monomers on a particulate, at least partially crosslinked rubber polymer, the graft polymer having a rubber content of from 30 to 80% by weight, based on 100 parts by weight of b).

8. A reactive system according to claim 1 characterized in that the compound present as component c) is selected from the group consisting of tertiary amines, imidazoles, tertiary or quaternary ammonium salts of alkylating or acid esters of organic phosphonic acids or of phosphoric acids and addition complexes of boron trihalides with tertiary amines.

9. A process for the preparation of a synthetic resin containing isocyanurate groups comprising mixing components a), b), c) and optionally component d) of a reactive system, followed by converting the resultant resin mixture to a cross-linked state by supplying heat to the resin mixture and/or utilizing heat of reaction of the resin mixture and optionally shaping the resultant product, said process is characterized in that the reactive system comprises:
a) a storage stable mixture of (i) a polyisocyanate component comprising at least one organic polyisocyanate and (ii) an epoxide component comprising at least one organic epoxide, in which the stability in storage has been ensured by a heat treatment of epoxide component (ii) in the presence of an alkylating agent, optionally carried out in the presence of at least a part of the polyisocyanate component (i), the quantitative ratios of components (i) and (ii) being chosen so that 100 g of component a) contain from 0.005 to 0.4 mol of epoxide groups,
b) a polymer modifier which is a of graft rubbers,
c) a catalyst and
d) optionally auxiliary agents and additives.

10. A process for a two-stage production of a synthetic resin containing isocyanurate and oxazolidinone groups comprising mixing components a), b), c) and optionally d) of a reactive system, followed by converting the resultant resin mixture to a crosslinked state by supplying heat to the resin mixture or utilizing heat of reaction of the resin mixture, and optionally dissolving the resin mixture in a suitable solvent and optionally evaporating off the solvent, followed by homogenizing the resin mixture in an extruder at a temperature below 100° C., and converting the resin mixture by shaping and further heating and optionally shaping into the final cross-linked state; said process is characterized in that the reactive system comprises:
a) a storage stable mixture of (i) a polyisocyanate component containing at least one organic polyisocyanate and (ii) an epoxide component containing at least one organic epoxide which has been reacted in the presence of a tertiary amine as catalyst to form an intermediate product which has a relatively high viscosity or is solid at room temperature and contains oxazolidinone and isocyanurate groups, the reaction being stopped by the addition of a quantity of alkylating sulphonic acid alkyl ester at least equivalent to the quantity of amine when at most 65% of the isocyanate groups present in the starting mixture have undergone reaction, the quantitative ratios of components (i) and (ii) being chosen so that 100 g of component a) contain from 0.005 to 0.4 mol of epoxide groups,
b) a polymer modifier which is a graft rubbers,
c) a latent catalyst and optionally
d) optionally auxiliary agents and additive 11. A process for the production of high performance composite materials comprising:
i) impregnating glass, carbon or aramide fibers in the form of woven or knitted fabrics, non-woven webs, layers or unidirectional fibers with the reactive system as recited in claims 1 which has been preactivated with a latent catalyst to form prepregs, optionally evaporating a solvent therefrom where the mixture had been dissolved in said solvent followed by
ii) curing and optionally shaping the resulting prepregs to
form the final shaped articles by further action of heat under pressure, and optionally after storage in the absence of moisture.

12. A composite material which is prepared by the process of claim 11.

* * * * *